United States Patent
Moon et al.

(10) Patent No.: US 9,235,463 B2
(45) Date of Patent: Jan. 12, 2016

(54) DEVICE AND METHOD FOR FAULT MANAGEMENT OF SMART DEVICE

(71) Applicant: Electronics and Telecommunications Research Institute, Daejeon (KR)

(72) Inventors: Yong-Hyuk Moon, Daejeon (KR); Jeong-Nyeo Kim, Daejeon (KR); Bo-Heung Chung, Daejeon (KR); Jin-Hee Han, Daejeon (KR); Dae-Won Kim, Daejeon (KR); Hwa-Shin Moon, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 162 days.

(21) Appl. No.: 14/028,486

(22) Filed: Sep. 16, 2013

(65) Prior Publication Data

US 2014/0115400 A1    Apr. 24, 2014

(30) Foreign Application Priority Data

Oct. 23, 2012  (KR) .......................... 10-2012-0117988

(51) Int. Cl.
| | |
|---|---|
| *G06F 11/07* | (2006.01) |
| *H04L 12/24* | (2006.01) |
| *G06F 11/34* | (2006.01) |

(52) U.S. Cl.
CPC .......... *G06F 11/079* (2013.01); *G06F 11/0748* (2013.01); *G06F 11/0793* (2013.01); *G06F 11/3452* (2013.01); *H04L 41/0631* (2013.01); *G06F 11/3409* (2013.01); *H04L 41/0883* (2013.01)

(58) Field of Classification Search
CPC ............ G06F 11/0748; G06F 11/3452; G06F 11/079; G06F 11/3409; G06F 11/0793; G06F 11/3447; G06F 11/008; G06F 11/22; G06F 11/2294; G06F 2201/86; H04L 41/0631; H04L 41/0883; H04L 43/50; H04L 43/08
See application file for complete search history.

(56) References Cited

U.S. PATENT DOCUMENTS

| | | | | |
|---|---|---|---|---|
| 6,138,122 | A  * | 10/2000 | Smith et al. ........................... | 1/1 |
| 6,697,969 | B1 * | 2/2004 | Merriam ......................... | 714/46 |
| 7,093,169 | B2 * | 8/2006 | Merriam ....................... | 714/47.2 |
| 7,171,670 | B2 * | 1/2007 | Motoyama et al. ........... | 719/310 |
| 2003/0055952 | A1 * | 3/2003 | Motoyama et al. ........... | 709/224 |
| 2004/0078503 | A1 * | 4/2004 | Zaudtke et al. ................. | 710/72 |
| 2005/0165927 | A1 * | 7/2005 | Motoyama et al. ........... | 709/224 |
| 2006/0136104 | A1 * | 6/2006 | Brozovich et al. .............. | 701/29 |
| 2007/0083513 | A1 * | 4/2007 | Cohen et al. ..................... | 707/6 |
| 2013/0059578 | A1 * | 3/2013 | Finberg ........................ | 455/425 |

FOREIGN PATENT DOCUMENTS

| | | |
|---|---|---|
| KR | 10-2002-0057047 A | 7/2002 |
| KR | 10-0405967 B1 | 11/2003 |
| KR | 10-1021657 B1 | 3/2011 |

* cited by examiner

*Primary Examiner* — Nadeem Iqbal (57) ABSTRACT

There is provided a method of fault management of a smart device including comparing a value of a fault detection indicator (hereinafter referred to as 'FDI') in a normal state, which detects faults generated in the smart device, with respect to at least one performance indicator, with an FDI value observed in real time and detecting the faults by calculating a relative variation level of the observed values, and creating a diagnosis object (hereinafter referred to as 'DO') including a cause and a countermeasure of the detected fault and analyzing the fault.

20 Claims, 8 Drawing Sheets

DEVICE AND METHOD FOR FAULT MANAGEMENT OF SMART DEVICE

CROSS-REFERENCE TO RELATED APPLICATION

This application claims the benefit under 35 U.S.C. §119 (a) of Korean Patent Application No. 10-2012-0117988, filed on Oct. 23, 2012, the entire disclosure of which is incorporated herein by reference for all purposes.

BACKGROUND

1. Field

The following description relates to technology to detect and analyze faults of an electronic device, and more particularly, to a device that can automate fault detection and analysis of a smart device.

2. Description of the Related Art

Recently, personal terminals designed to perform only a specific function, for example, a music file player, an e-Book reader, an electronic dictionary, and a mobile phone, are being replaced by smart devices that actually perform PC functions. Therefore, a variety of services based on mobile applications, for example, universal device synchronization and file sharing, are becoming commercialized and common. Terminals having sophisticated functions with a variety of sizes and specifications have been released.

However, despite the popularity of such smart devices, development of terminal management technology has not significantly progressed. In particular, a terminal fault needs to be automatically managed in real time. However a variety of software fault problems can occur in a terminal device, and it is difficult for a personal user to analyze the terminal fault and to address associated problems directly.

Meanwhile, as the smart device is recognized as an important network element, remote terminal management technology has become a big issue for smart device manufacturers as well as application service providers for smart devices. However, operators have a big burden of costs in terms of capital expenditures (CAPEX) and operational expenditures (OPEX) with a conventional passive type of terminal management. Accordingly, it is urgent to provide an automated terminal fault management framework for terminal-based service markets.

Meanwhile, in order to overcome limitations on passive analysis methods that depend on a service operator for determining abnormalities of the terminal, a method in which static rules or policies were defined and faults were accordingly detected and analyzed based on If/Else statements has been mainly applied conventionally. However, such conventional methods have a problem in that the number of rules becomes massive when a size of networks configured with terminals increases.

As an alternative method, a method in which a separate threshold is set to an individual performance indicator and the fault is determined by merely observing breach of the threshold has been proposed. However, in reality, it is difficult to set appropriate thresholds, and it has a disadvantage in that the threshold value needs to be continuously recalibrated according to states of the terminal and the network even when an initial threshold was accurate.

As an improved method, a method based on pattern matching is being studied but has a problem in that it is difficult to apply determination formulas and it needs a large amount of calculation to determine the fault.

Moreover, the above-described three methods have a disadvantage in that they include many errors in detection and analysis since they are based on binary decision to determine whether there is a fault. That is, since those detection techniques based on simplified information have structural vulnerability causing information loss, they have low effectiveness when applied to actual systems.

SUMMARY

The following description relates to a device and a method for fault management of a smart device that can minimize intervention of a service operator by supporting an automated detection and analysis procedure of a terminal fault.

Moreover, the following description relates to a device and method for fault management of the smart device that can minimize errors due to fragmented analysis.

In one general aspect, a method of fault management of the smart device includes comparing a value of a fault detection indicator (hereinafter referred to as 'FDI') in a normal state, which detects faults generated in the smart device, with respect to at least one performance indicator, with an FDI value observed in real time and detecting the faults by calculating a relative variation level of the observed values, and creating a diagnosis object (hereinafter referred to as 'DO') including a cause and a countermeasure of the detected fault and analyzing the fault.

In another aspect, a device for fault management of the smart device includes an FDI level calculating unit configured to compare a value of a fault detection indicator (hereinafter referred to as 'FDI') in a normal state, which detects faults generated in the smart device, with respect to at least one performance indicator, with an FDI value observed in real time and detect the faults by calculating a relative variation level of the observed values, an association degree checking unit configured to check association with a diagnosis object (hereinafter referred to as 'DO') including a cause and a countermeasure of the detected fault, and a relevance estimating unit configured to compare an association value checked by the association degree checking unit and create a DO having a maximum relevance value.

Other features and aspects will be apparent from the following detailed description, the drawings, and the claims.

BRIEF DESCRIPTION OF THE DRAWINGS

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Hereinafter, exemplary embodiments will be described in detail with reference to the accompanying drawings. The following exemplary embodiments should be considered in a descriptive sense only to understand sprit of the invention and the scope of the invention is not limited by the embodiments.

In general, when a value, an operation, or a pattern suspected as a fault is detected in various smart devices, a service operator directly intervenes and passively analyzes, for example, accuracy of fault detection, identification of causes and countermeasures in order to verify the fault. This procedure will be described with reference to FIG. 1.

Figure 1:
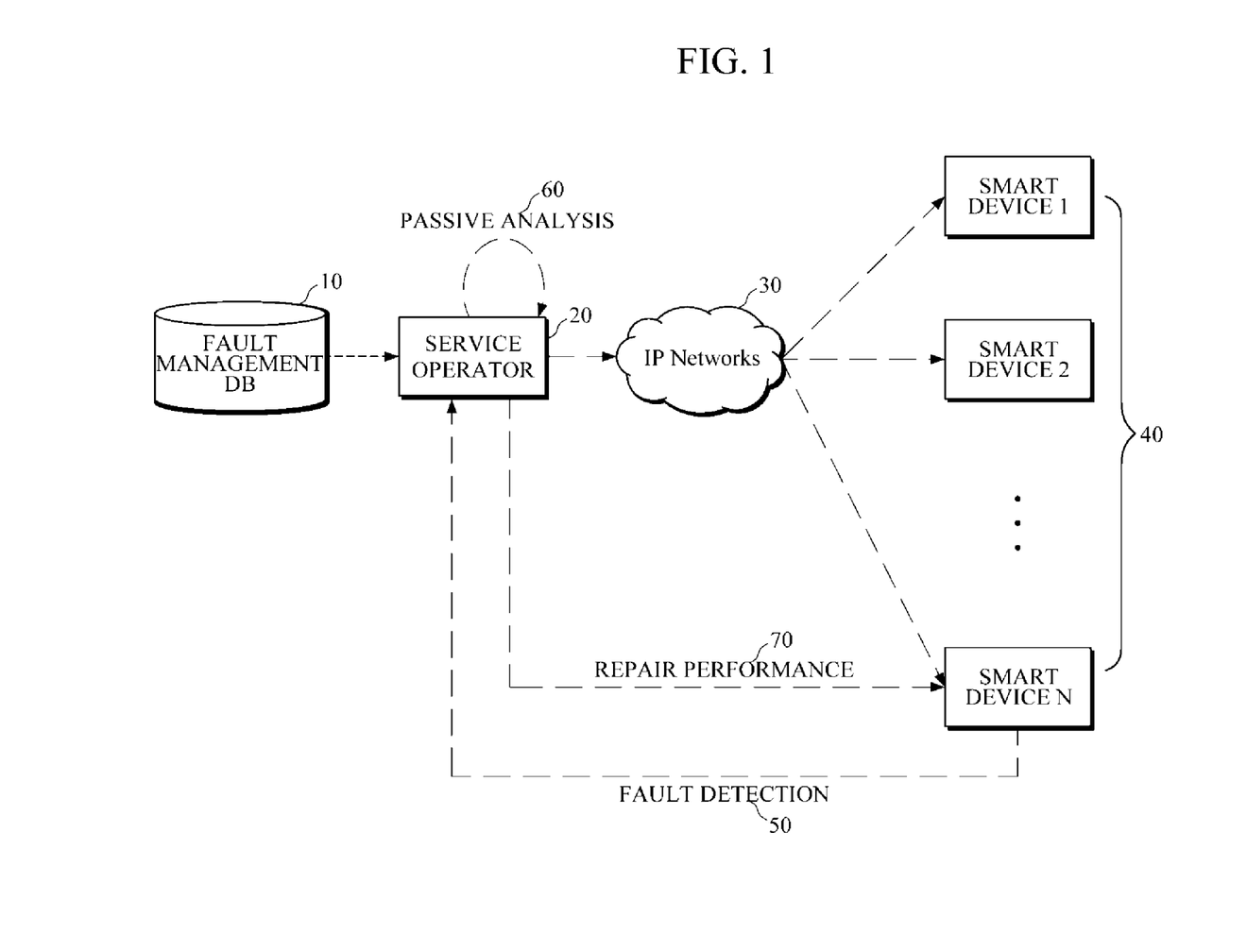
FIG. 1 is diagram illustrating a general structure of a fault detection and analysis service.

FIG. 1 is diagram illustrating a general structure of a fault detection and analysis service.

As illustrated in FIG. 1, a fault management DB 10 is a set of reference data recording, for example, a value, an operation, and a pattern confirmed as a fault based on previous data determined as an actual fault.

A service operator 20 refers to an operator who manages a service or a network and analyzes whether or not the detected fault is an actual fault, a cause of fault generation, and a countermeasure according to the fault generation cause.

An IP network 30 generally refers a communication network including the Internet based on a TCP/IP protocol.

A smart device 40 refers to a personal terminal held by a user and includes a smart phone, a tablet PC, and a variety of smart devices having a type of tab. Most services and applications operated in a conventional PC may be operated in such smart devices.

Fault detection 50 may be performed by a passive monitoring method in which the smart device 40 informs the service operator 20 of a specific fault or an active monitoring method in which the service operator 20 can directly detect whether or not there is a fault in each smart device 40.

Passive analysis 60 refers to a process in which the service operator 20 directly intervenes and passively analyzes content of the fault.

Repair performance 70 refers to remotely performing the countermeasure for addressing the cause of the content confirmed as the fault. Since the remote fault repairing may be difficult according to a state of the smart device, it may be optionally performed.

As illustrated in FIG. 1, however, the passive smart device fault detection and analysis method have limitations in managing a variety of software fault problems since a single device can process a variety of applications. Therefore, there are provided a device and method that can automatically manage the terminal fault.

Figure 2:
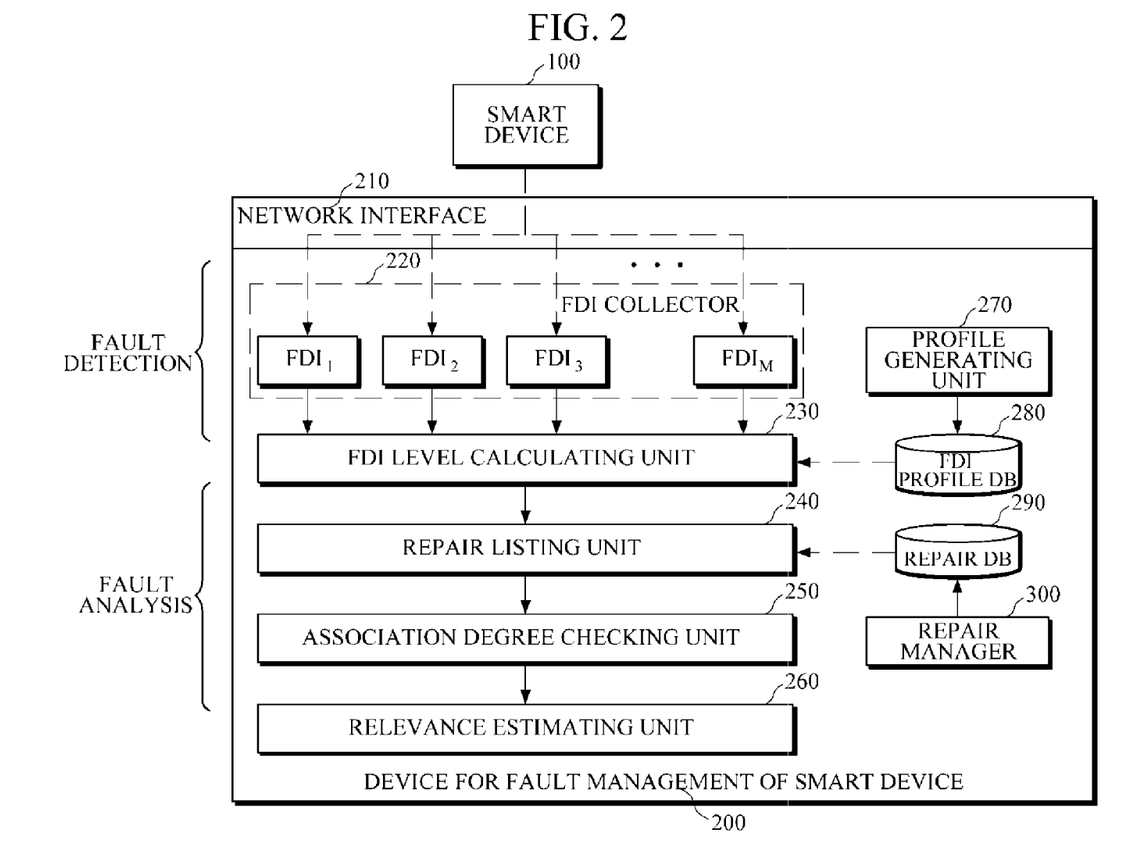
FIG. 2 is a diagram illustrating a device for fault management of a smart device according to an embodiment of the invention.

FIG. 2 is a diagram illustrating a device for fault management of the smart device according to an embodiment of the invention.

As illustrated in FIG. 2, a fault management device 200 of the smart device refers to a management framework that performs overall processes of fault detection and analysis of a smart device 100.

A network interface 210 is a network interface for transmitting and receiving data to deliver FDI values observed in the smart device 100 to the fault management device 200.

An FDI collector 220 collects FDI observation values from the smart device 100 and may be configured with a plurality of FDIs including FDI1 to FDIM. Here, the FDI refers to a fault detection indicator. As an example of the FDI, performance indicators, for example, network delay, channel bandwidth, CPU load, and battery consumption of a device, may be considered. Therefore, the FDI may be defined as a set including a plurality of performance indicators for fault detection described above.

An FDI level calculating unit 230 calculates levels of the FDI values obtained from the FDI collector 220. Here, the FDI level refers to a value quantifying how much variation is represented in an observed FDI normal distribution model of a current smart device compared to an FDI normal distribution model in a normal state. That is, an amount of difference between the FDI profile value generated in the normal state of the smart device 100 and current collected FDI value is calculated in terms of the normal distribution model. This will be described in detail below with reference to FIG. 5.

A repair listing unit 240 retrieves all repairs including a specific DO (for example, an x-th DO: $DO_x$) from a repair database 290 and sorts them with specific acquisition criteria (for example, date of repair generation).

Here, the repair includes a pair of a subset of the FDI and a DO, in the form of ($Repair_i = (f_j^{sub}, DO_x)$). Repair, represents an i-th repair including $DO_x$, where i=1, 2, 3, . . . , and R. Further, $f_j^{sub}$ represents a j-th subset of the FDI, where j=1, 2, 3, . . . , 2|FDI|−1. $DO_x$ represents an x-th DO, where x=1, 2, 3, . . . , Q.

Here, the $DO_x$ includes root cause(s) or action(s). The root cause(s) refers to major cause(s) of corresponding fault generation. The action(s) refers to a countermeasure(s) for addressing a corresponding fault. For example, the $DO_x$ may be configured with a form of "$DO_x$(Root Cause(s))", "$DO_x$(Action(s))", or "$DO_x$(Root Cause(s), Action(s))." In the third form of the $DO_x$, it is assumed that relation between root cause(s) and action(s) may be previously configured in accordance with conventional methods, general fault cause(s) and solution(s) thereof.

Moreover, since different $f_j^{sub}$ can be paired with the same $DO_x$, the repair including the $DO_x$ is not limited to one but may be plural.

An association degree checking unit 250 determines which DO has the highest association with an individual FDI. For this purpose, a relative occurrence frequency of each FDI in all repairs including a corresponding DO is calculated. This calculation is repeated until calculation of the association value of all FDIs in which abnormal variations are observed in all repairs including the specific DO is completed. This will be described in detail below with reference to FIGS. 6A and 6B.

A relevance estimating unit 260 searches for a DO having the highest association with the latest observed FDI value and estimates cross-relevance using an FDI level value calculated by the FDI level calculating unit 230 and an association value calculated by the association degree checking unit 250. That is, the FDI level value means a variation difference with respect to the profile and the association value serves as a weighted value. This will be described in detail below with reference to FIGS. 6A and 6B.

A profile generating unit 270 identifies an average value and a variance value of each FDI value, and which form of probability distribution model is close to a corresponding FDI value based on data observed when the smart device 100 is in a normal state, that is, in a faultless state, and generates an FDI profile based on those three pieces of data. In particular, since a plurality of FDI profiles may be generated with respect to the same FDI depending on, for example, a target FDI, a measured time zone, a target device, a target application, and a target event, accuracy of the fault analysis may be increased. This will be described in detail below with reference to FIG. 4.

An FDI profile DB 280 refers to a database managing the plurality of FDI profiles generated by the profile generating unit 270. In the present invention, it is assumed that such a database is prepared in advance. The FDI profile DB 280 may be detected and used by the FDI level calculating unit 230.

A repair DB 290 is a database storing and managing a plurality of $Repair_i=(f_j^{sub}, DO_x)$ with respect to a case determined as the actual fault. The repair DB 290 may be detected and used by the repair listing unit 240.

A repair manager 300 creates, in advance, and manages the FDI in which the variation was found, a major cause (root cause) leading the variation of the FDIs, and the countermeasure (action) to address the cause with respect to the case determined as the actual fault in a form of repair.

Figure 3:
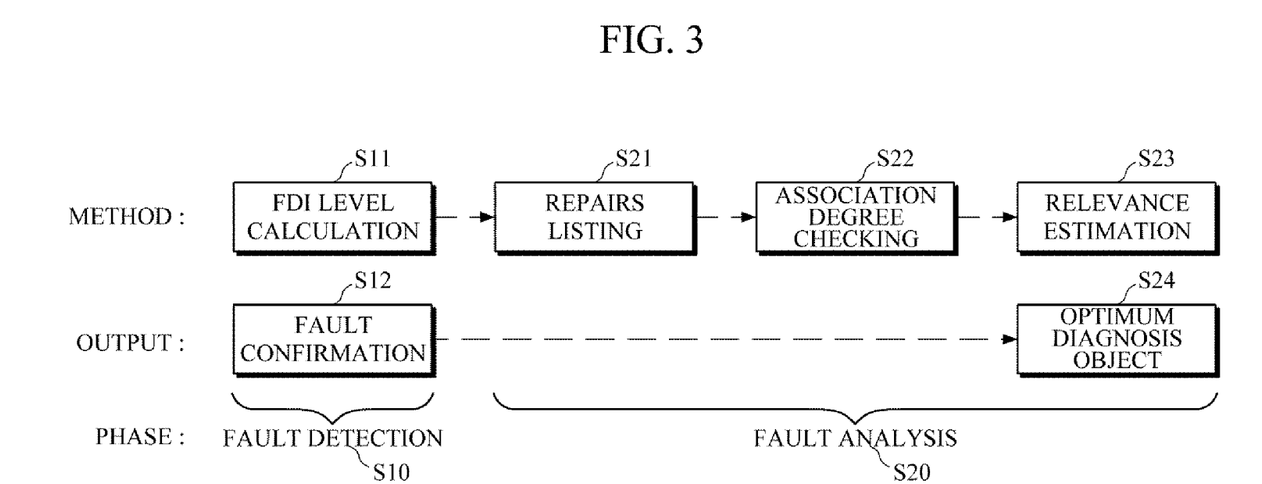
FIG. 3 is a diagram illustrating a method of fault management of the smart device according to the embodiment of the invention.

FIG. 3 is a diagram illustrating a method of fault management of the smart device according to the embodiment of the invention.

As illustrated in FIG. 3, the method of fault management of the smart device includes a fault detection operation (S10) and a fault analysis operation (S20)

As a result of the fault detection operation (S10), the fault may be confirmed, and as a result of the fault analysis operation (S20), a compliant DO may be output.

Specifically, the fault detection operation (S10) is performed through an FDI level calculation (S11). This will be described in detail below with reference to FIG. 5.

Although not illustrated in drawings, an FDI profile generation that previously prepares the performance indicator corresponding to the individual FDI should be performed in advance to the FDI level calculation (S11). This will be described in detail below with reference to FIG. 4.

Specifically, the fault analysis operation (S20) includes sub-operations, repairs listing (S21), association checking (S22) and relevance estimation (S23).

The repairs listing (S21) includes obtaining all repairs including the specific DO (for example, an x-th DO: $DO_x$) and sorting them based on specific criteria (for example, date of repair generation).

The association checking (S22) includes analyzing an association relation between the latest observed FDI value based on the fault detection time and each repair including the specific $DO_x$, and determining relevance of $DO_x$ with respect to corresponding fault.

The relevance estimation (S23) includes estimating a degree of relevance (or suitability) of the specific $DO_x$ configured with the root cause(s) and the action(s) as the cause analysis and the countermeasure corresponding to the fault. Moreover, the relevance estimation (S23) is a process in which the $DO_x$ having the highest relevance value is matched with the most appropriate cause analysis and countermeasure for the corresponding smart device or a specific event of corresponding smart device.

The association checking (S22) and the relevance estimation (S23) will be described below in detail with reference to FIGS. 6A and 6B.

That is, the invention relates to technology for selecting the $DO_x$ that makes an optimum correspondence (pair-wise) with a specific fault. Finally, the service operator may obtain the most appropriate $DO_x$ with respect to the corresponding fault.

Figure 4:
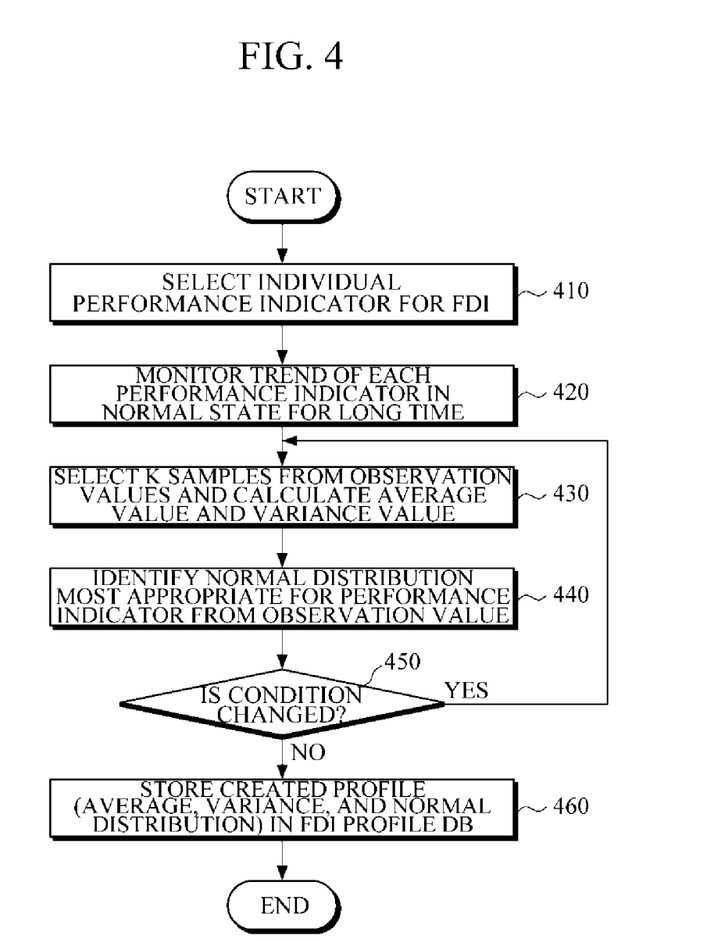
FIG. 4 is a flowchart for describing FDI profile generation operations according to the embodiment of the invention.

FIG. 4 is a flowchart for describing FDI profile generation operations according to the embodiment of the invention.

As illustrated in FIG. 4, in operation 410, the repair manager 300 or the operator previously prepares the performance indicator corresponding to the individual FDI.

In operation 420, the profile generating unit 270 observes FDI values for a long time while each performance indicator is in a normal state. Associated FDI values are expressed as being measured k times at time intervals of n as in the following Formula 1.

$$\underbrace{x_1, \ldots, x_n}_{a_1}, \underbrace{x_{n+1}, \ldots, x_{2n}}_{a_2}, \ldots, \underbrace{x_{(k-1)n+1}, \ldots, x_{kn}}_{a_k} \quad (1)$$

In Formula 1, $x_1$ represents a first observation value of the individual FDI and a total number kn of observation values may be derived. $a_1$ represents an average value of data observed from $x_1$ to $x_n$ and k average values of data may be derived.

In operation 420, the profile generating unit 270 extracts k average values from observation values $x_1$ to $x_{kn}$, and calculates an average value and a variance value using Formula 2 and Formula 3 given below.

$$\mu_c(Y) = \frac{1}{k}\sum_{i=1}^{k} a_i \quad (2)$$

In Formula 2, $\mu_c(Y)$ represents an arithmetic mean value from $a_1$ to $a_k$ with respect to a specific c-th FDI and Y represents a random variable indicating a data observation value.

$$\sigma_c^2(Y) = \frac{1}{k}\sum_{i=1}^{k} (a_i - \mu_1(Y))^2 \quad (3)$$

In Formula 3, $\sigma_c^2(Y)$ represents a variance value from $a_1$ to $a_k$ with respect to the c-th FDI.

Here, if xi observation samples are independent and identically distributed (I.I.D), arbitrary $a_j$ follows a normal distribution as n increases infinitely. Therefore, when each $x_i$ sample is obtained from different users or from different events of the same user device, $x_i$ is also I.I.D, and the random variable Y also follows the normal distribution having the value of Formula 2 and Formula 3.

In operation 430, the profile generating unit 270 identifies the most appropriate probability distribution model to the individual FDI from the observation value.

In operation 440, the profile generating unit 270 determines whether a condition is changed. This is for generating the plurality of profiles with respect to the same FDI by repeatedly performing operations 430 and 440 under different conditions, for example, a measured time zone, a target device, a target application, and a target event.

When the condition is changed in operation 440, the profile generating unit 270 proceeds to operation 430. On the other hand, when the condition is not changed in operation 440, that is, when operations 430 and 440 are performed in all possible conditions, the profile generating unit 270 proceeds to operation 460.

In operation 460, the profile generating unit 270 stores created profiles in the FDI profile DB 280.

Figure 5:
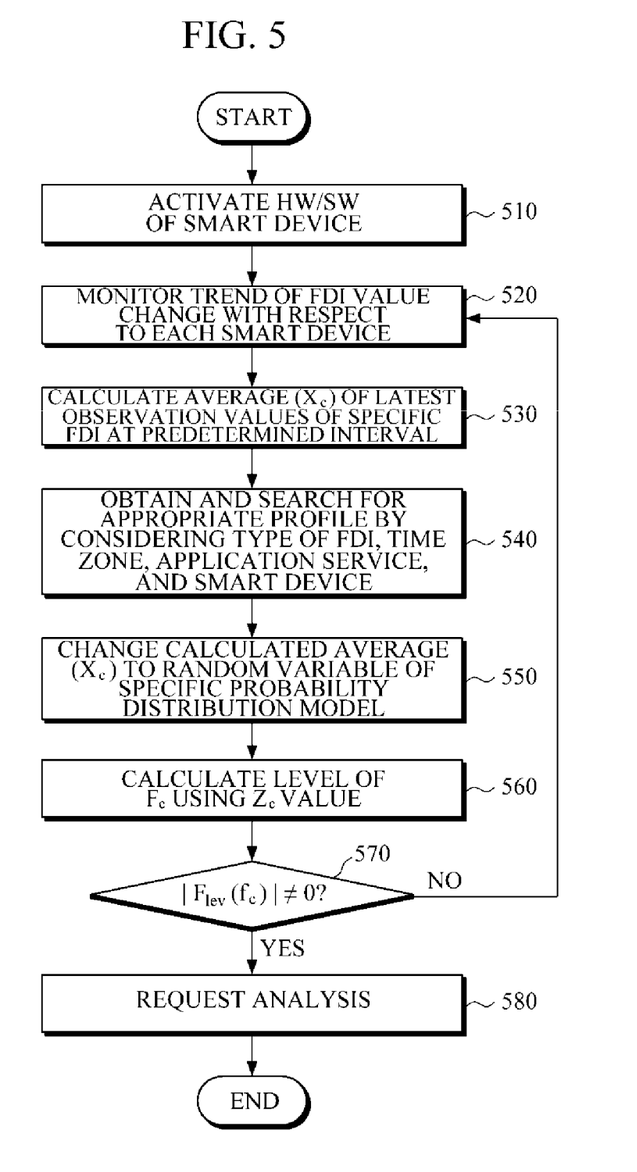
FIG. 5 is a flowchart for describing fault detection operations based on an FDI level according to the embodiment of the invention.

FIG. 5 is a flowchart for describing fault detection operations based on an FDI level according to the embodiment of the invention.

As illustrated in FIG. 5, hardware and software of the smart device 100 are activated in operation 510.

In operation 520, the FDI collector 220 of the fault management device 200 of the smart device monitors the latest values of all FDIs of the smart device 100.

In operation 530, the FDI collector 220 of fault management device 200 of the smart device calculates an average of the latest observation values of a specific FDI from FDI1 to FDIM at a predetermined interval. This is expressed by following Formula 4

$$\frac{\ldots x_{t-n}, x_{t-n+1}, \ldots, x_t}{X_c} \quad (4)$$

In Formula 4, $x_{t-n}$, $x_{t-n+1}$, ..., $x_t$ represents the latest observed data values of the specific c-th FDI and $X_c$ represents an average value of the latest observed values of the specific c-th FDI.

In operation 540, the FDI level calculating unit 230 of the fault management device 200 of the smart device obtains an appropriate profile by retrieving profiles from the FDI profile DB 280 in consideration of time zone of the observed c-th FDI, the target application service or the smart device.

In operation 550, the FDI level calculating unit 230 of the fault management device 200 of the smart device changes the calculated average Xc to a random variable Zc of a specific probability distribution model using following Formula 5.

$$Z_c = \frac{(X_1 - \mu_C(Y))}{\sigma_c(Y)} \quad (5)$$

In Formula 5, $\mu_c(Y)$ and $\sigma_c(Y)$ represent an average and a standard deviation of the c-th FDI. The two values are obtained from the FDI profile created when the FDI value is normal. $Z_c$ represents a normalized value of a degree of difference between an average value of currently observed data and an average value of the FDI profiles in terms of the standard deviation.

In operation 560, the FDI level calculating unit 230 of the fault management device 200 of the smart device calculates the specific c-th FDI level using the value $Z_c$ as in the following Formula 6.

$$F_{lev}(f_c) = F_{CDF}(K + Z_c) \quad (6)$$

In Formula 6, $F_{lev}(f_c)$ represents a level function to evaluate a specific c-th FDI($f_c$) level. This level function may have a form of a cumulative distribution function (CDF) of a specific probability distribution, that is, $F_{CDF}(.)$. Here, K represents an arbitrary constant value and it may be adjusted by the operator. Moreover, Formula 6 defines a level function that may be used when an increase of the FDI value can be determined as the fault generation. However, even when the fault is generated due to a decrease of the FDI value or a deviation from a specific value, the above process may be easily adapted.

In operation 570, the FDI level calculating unit 230 of the fault management device 200 of the smart device determines whether an absolute value of the c-th FDI level is 0. This is to determine whether the fault of the smart device is generated.

When the determination result of operation 570 is that the absolute value of the FDI level is not 0, that is, it is determined that the fault is generated in the smart device, the FDI level calculating unit 230 of the fault management device 200 of the smart device requests an analysis process in operation 580. However, when the determination result of operation 570 is that the absolute value of the FDI level is 0, that is, it is determined that the fault is not generated in the smart device, the FDI level calculating unit 230 of the fault management device 200 of the smart device proceeds to operation 520.

The fault detection operation based on the FDI level explained in FIG. 5 may be repeatedly performed with respect to the plurality of FDIs in the same way.

Figure 6A:
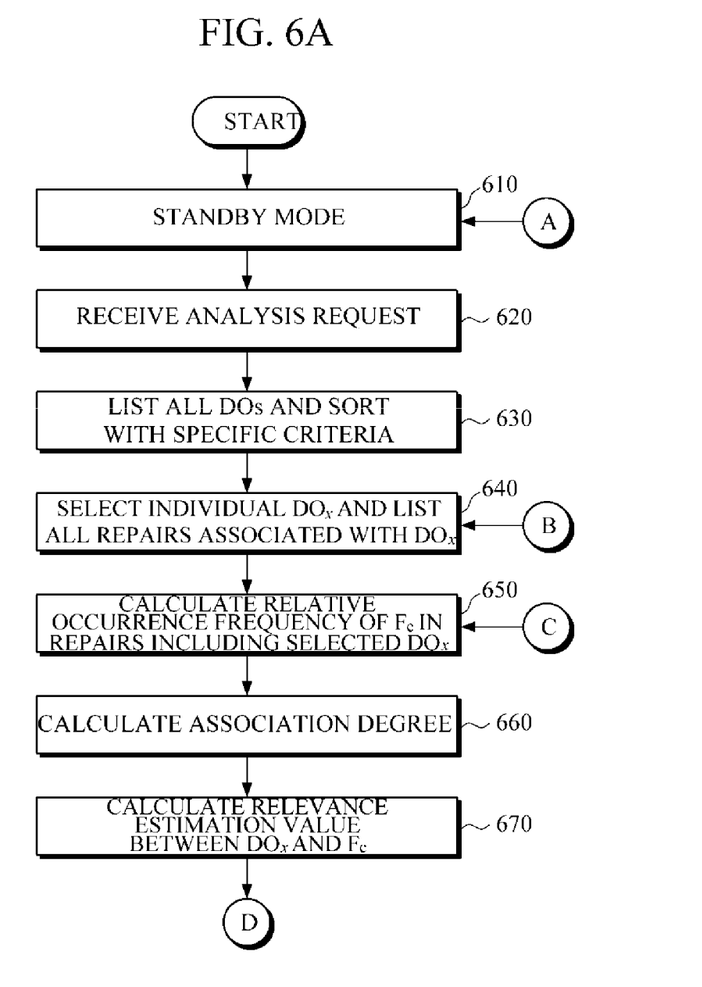
FIGS. 6A and 6B are flowcharts for describing fault analysis operations according to the embodiment of the invention.
Figure 6B:
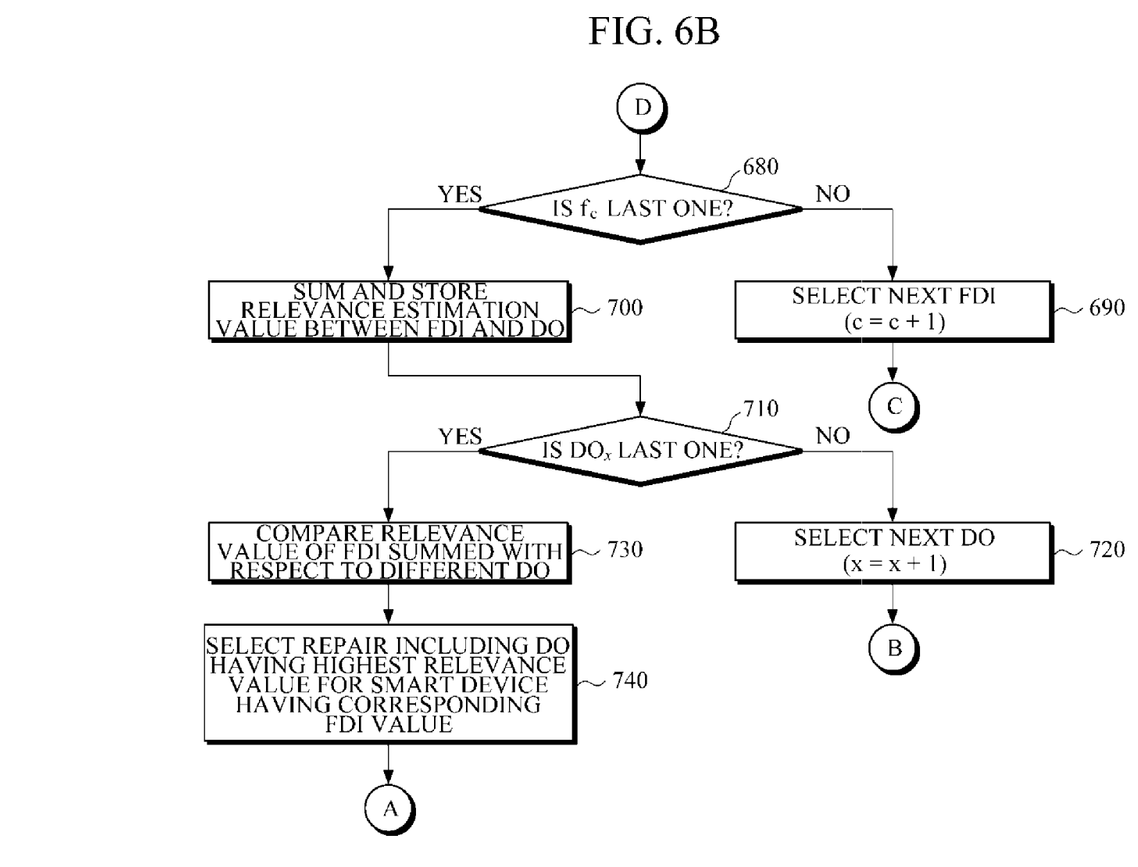

FIGS. 6A and 6B are flowcharts for describing fault analysis operations according to the embodiment of the invention.

In operation 610, the fault analysis process maintains a standby state until a request is received.

The analysis request is received in operation 620, and in operation 630 the repair listing unit 240 of the fault management device 200 of the smart device obtains all repairs including the specific DO (for example, an x-th DO: $DO_x$) by retrieving them from the repair DB 290 and sorts them based on specific criteria (for example, date of repair generation).

In operation 640, the association degree checking unit 250 of the fault management to device 200 of the smart device calculates a relative occurrence frequency of the specific c-th FDI in repairs including the specific $DO_x$ using the following Formula 7 and Formula 8. That is, it calculates how many occurrence frequencies the individual FDI has with respect to all repairs including the specific DO.

$$rf(f_c, DO_x) = \frac{1}{|R(DO_x)|} \sum_{\forall f_{sub}^j \in FDI(DO_x)} ind(f_c, f_{sub}^j) \quad (7)$$

In Formula 7, rf(.) represents a function indicating a relative occurrence frequency, $f_c$ represents a c-th individual FDI, and $DO_x$ represents an x-th DO. An individual repair including the $DO_x$ also includes a subset ($f_j^{sub}$) of a different FDI. That is, the repair is configured with a pair of a $DO_x$ and an $f_j^{sub}$. Further, $|R(DO_x)|$ represents a number of all repairs (cardinality) including the $DO_x$.

$$ind(f_c, f_{sub}^j) = \begin{cases} 1, & \text{if } f_c \in f_{sub}^j \\ 0, & \text{if } f_c \notin f_{sub}^j \end{cases} \quad (8)$$

In Formula 8, ind($f_c$, $f_j^{sub}$) serves as an indicator that returns 1 when $f_c$ is an element of the $f_j^{sub}$ and returns 0 or not. Therefore, rf($f_c$, $DO_x$) counts a case in which the specific FDI is the element of the $f_j^{sub}$ in all repairs including the $DO_x$ and the counted value is divided by a number of all repairs. As a result, a relative frequency at which the $f_c$ occurs in the repair associated with the $DO_x$ may be calculated.

In operation 660, the association degree checking unit 250 calculates an association degree between the $DO_x$ and the $f_c$ using following Formula 9.

$$A_{deg}(rf(f_c, DO_x)):[0,1] \to [0,1] \quad (9)$$

In Formula 9, Adeg(.) represents a function that quantitatively indicates an association degree between the $DO_x$ and the $f_c$. The task of checking a relative occurrence frequency is called association degree checking. The association degree checking will be described in detail below with reference to FIG. 7.

In operation 670, the relevance estimating unit 260 calculates a relevance estimation value between the $DO_x$ and the $f_c$ using Formula 10 and Formula 11 given below.

The following Formula 10 and Formula 11 calculate a degree of relevance of the specific DO as a major cause and a countermeasure for the individual FDI and are example formulas necessary to sum the individual relevance of how great a degree of relevance the same DO has with respect to all FDIs.

$$re(f_c) = A_{deg}(rf(f_c, DO_x)) \cdot F_{dis}(f_c, DO_x) \quad (10)$$

In Formula 10, $re(f_c)$ represents a relevance estimation function and this function is defined as a product of an association function $A_{deg}(rf(f_c, DO_T))$ and a distance function Formula 11 described below. That is, the $A_{deg}(.)$ function serves as a weight factor in Formula 10.

$$F_{dis}(f_c, DO_x) = \begin{cases} F_{lev}(f_c), & rf(f_c, DO_x) \geq 0.5 \\ 1 - F_{lev}(f_c), & rf(f_c, DO_x) < 0.5 \end{cases} \quad (11)$$

In Formula 11, $F_{di}(f_c, DO_T)$ is a distance estimation function designed to differently estimate a deviation between $f_c$ and $f_c$ of the profile according to the relative occurrence frequency. For example, when the relative occurrence frequency of the $f_c$ is equal to or greater than 0.5, the level function $F_{lev}(f_c)$ is a distance value, and when the relative occurrence frequency of the $f_c$ is less than 0.5, $1 - F_{lev}(f_c)$ is the distance value.

As illustrated in FIG. 6B, in operation 680, the relevance estimating unit 260 determines whether the $f_c$ is the last one.

When the determination result of operation 680 is that the $f_c$ is not the last one, the relevance estimating unit 260 selects a next FDI (for example: $f_c+1$) in operation 690, and proceeds to operation 650.

On the other hand, when the determination result of operation 680 is that the $f_c$ is the last one, the relevance estimating unit 260 sums and stores relevance values of all FDIs with respect to the specific DO using following Formula 12 in operation 700.

$$S(DO_x) = \Sigma_{\forall f_c \in FDI} re(f_c) \quad (12)$$

Formula 12 calculates all FDIs levels and a relative occurrence frequency of each FDI with respect to the specific individual $DO_x$. The association degree between the $f_c$ and the individual $DO_x$ is measured using the calculated value as a weight factor. After the relevance degree between the $f_c$ and the individual $DO_x$ is calculated, relevance values of all FDIs with respect to the specific $DO_x$ are summed, and thereby the relevance of the FDI with respect to the $DO_x$ may be quantitatively evaluated.

In operation 710, the relevance estimating unit 260 determines whether the $DO_x$ is the last one.

When the determination result of operation 710 is that the $DO_x$ is not the last one, the relevance estimating unit 260 selects a next DO (for example, $DO_x+1$) in operation 690, and proceeds to operation 640.

On the other hand, when the determination result of operation 710 is that the $DO_x$ is the last one, the relevance estimating unit 260 compares relevance values of FDI summed with respect to a different last DO in operation 730.

In operation 740, the relevance estimating unit 260 determines the specific DO having the highest relevance value as an optimum repair of the smart device 100 in which the value of a corresponding FDI is observed. That is, the $DO_x$ having the highest quantitative value is finally given as a repair for the FDI.

Figure 7:
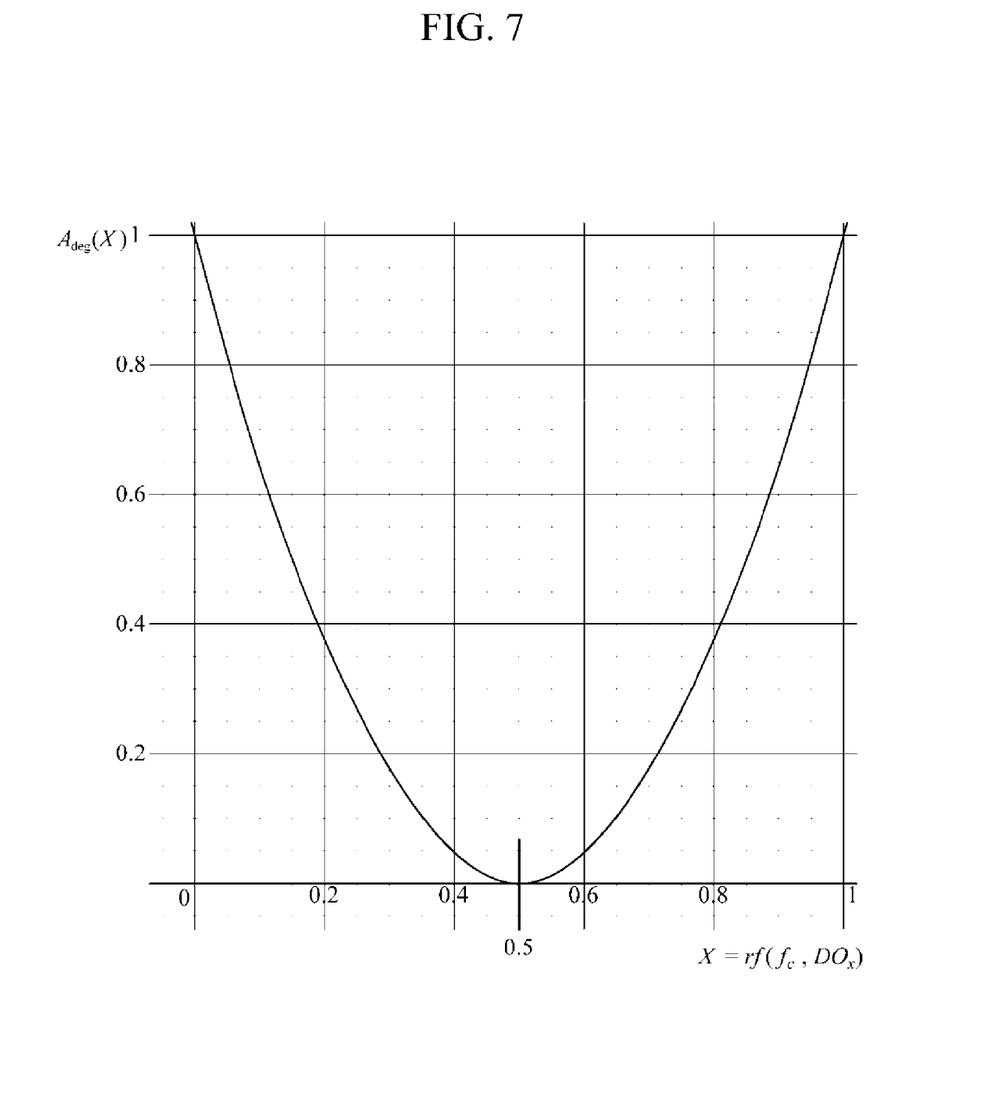
FIG. 7 is a graph for describing association checking according to the embodiment of the invention.

FIG. 7 is a graph for describing association degree checking according to the embodiment of the invention.

As illustrated in FIG. 7, when an occurrence frequency of the $f_c$ increases (that is, a value of $rf(f_c, DO_x)$ is greater than 0.5 or close to 1) or the occurrence frequency is significantly low (that is, a value of $rf(f_c, DO_x)$ is less than 0.5 or close to 0), an association value $Adeg(rf(f_c, DO_x))$ is close to 1, and thereby a high association degree between the $f_c$ and the $DO_x$ is represented. However, when a value of $rf(f_c, DO_x)$ is 0.5, since the $f_c$ is included in 50% of the repair and not included in the remaining 50% of the repair, it is difficult to clearly determine the association. Accordingly, in this case, the association value is represented as 0 and no association is assumed.

For this purpose, using the graph ($y=4*(x-0.5)^2$, $x=rf(f_c, DO_x)$) illustrated in FIG. 7, the following association is quantified. The graph illustrated in FIG. 7 is only an example to calculate a degree of association between the $DO_x$ and the $f_c$ and the operator may select and appropriately use a different form of graph according to characteristics of the FDI.

According to the embodiments of the invention, since the fault of the personal terminal including the smart device is automatically matched with the FDI and the DO in real time, it is possible to accurately detect the fault and determine corresponding cause.

Moreover, since a method which not only determines whether or not there is a fault as in conventional methods, but in which the FDI indicating fault detection and its corresponding most appropriate fault cause (root cause(s)) and countermeasure (action(s)) are matched as a pair is provided, practical measure (repair) of the terminal fault may be possible. Conventional fault detection systems based on thresholds have limitations, for example, accuracy of fault detection is greatly influenced by an arbitrarily set threshold, a preset threshold needs to be repeatedly recalibrated according to the case confirmed as the fault, or different thresholds need to be preset according to target performance of the fault, events, and environments of the smart device. However, the invention may perform fault detection and analysis without depending on a threshold.

The invention provides FDI indicators considering a variety of performance indicators or capable of adding or deleting a variety of performance indicators, and a variety of profiles according to a measured time zone, a target smart device, a target application, and a target event may be easily generated using only three pieces of data including an average value, a variance value, and a type of the probability distribution model. As a result, it is possible to generate and manage massive profiles. Due to generation and management of the massive profiles, fault detection and analysis may be sensitively performed according to changes of a size and a state of the network including the smart device.

Furthermore, the invention has an advantage in that the level function of determining whether an initial fault is generated, the function of calculating an association degree between the specific FDI and the DO, and the function of estimating relevance between the specific FDI and the DO may be easily implemented, and computational complexity of corresponding functions is also low.

In addition, the invention has a high effectiveness since it provides a structural characteristic that can be applied without modification of an existing system (legacy system). In such a situation, the terminal fault causes cost burdens according to offline follow-up actions in a corporation and damage to a corporation's image. However, the invention may automatically process such problems in real time with a high accuracy.

The above-described descriptions are only exemplary of the invention. It will be understood by those skilled in the art that modifications in form may be made without departing from the spirit and scope of the invention. Therefore, the invention is not limited to the above-described embodiments and encompasses all modifications and equivalents that fall within the scope of the appended claims.

The present invention can be implemented as computer-readable code in a computer-readable recording medium. The computer-readable recording medium includes all types of recording media in which computer-readable data is stored. Examples of the computer-readable recording medium include a ROM, a RAM, a CD-ROM, a magnetic tape, a floppy disk, and an optical data storage. Further, the recording medium may be implemented in the form of carrier waves, such as those used in Internet transmission. In addition, the computer-readable recording medium may be distributed among computer systems over a network such that computer-readable codes may be stored and executed in a distributed manner.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of fault management of a smart device, the method comprising:
    comparing a value of a fault detection indicator (hereinafter referred to as 'FDI') obtained in a normal state, which is used to detect a fault generated in the smart device, with respect to at least one performance indicator, with an FDI value observed in real time;
    detecting the fault by calculating a relative variation level of the FDI values; and
    analyzing the detected fault and creating a diagnosis object (hereinafter referred to as 'DO') including a cause and a countermeasure of the detected fault.

2. The method according to claim 1, wherein the performance indicators include at least one of network delay, channel bandwidth, and CPU load.

3. The method according to claim 1, further comprising generating a profile including the FDI value in the normal state, before detecting the fault.

4. The method according to claim 3, wherein the generating of the profile includes:
    monitoring FDI values when each performance indicator is in a normal state;
    calculating an average value and a variance value of the monitored FDI values;
    identifying a probability distribution model that is the most appropriate for an individual FDI by analyzing the average value and the variance value; and
    storing profiles including the average value, the variance value, and the probability distribution model of the FDI values.

5. The method according to claim 4, further comprising extracting average values of monitored FDI values at a predetermined interval after the monitoring of the FDI values, wherein the calculating of the average value includes calculating an average of the average values of the monitored FDI values at the predetermined interval.

6. The method according to claim 4, wherein the generating of the profile is repeatedly performed under different conditions including a measured time zone, a target device, a target application, and a target event.

7. The method according to claim 1, wherein the detecting of the fault includes:
    collecting observed FDI values of the smart device;
    calculating an average value of the collected FDI values;
    detecting a profile appropriate for the observed FDI values;
    changing the average value of the collected FDI values to a random variable of a specific probability distribution model using information on the detected profile;
    calculating an FDI level value using the random variable of the specific probability distribution model; and
    determining whether the fault is generated based on the calculated FDI level value.

8. The method according to claim 7, wherein the detecting of the profile includes detecting a corresponding profile by considering at least one of a time zone in which the FDI value is observed, a target application service, and the smart device.

9. The method according to claim 7, wherein the determining whether the fault is generated includes determining that a fault is generated when an absolute value of the calculated FDI level value is not 0.

10. The method according to claim 1, wherein the analyzing of the fault includes:
    listing at least one repair configured with a pair of a subset of the FDI and the DO;
    checking association of at least one DO; and
    selecting a DO having the highest relevance value in the at least one DO.

11. The method according to claim 10, wherein the checking of the association includes:
    calculating a relative occurrence frequency of the FDI in repairs including a specific DO; and
    calculating an association degree between the specific DO and the FDI according to the calculated relative occurrence frequency.

12. A device for fault management of a smart device comprising:
    an FDI level calculating unit configured to compare a value of a fault detection indicator (hereinafter referred to as 'FDI') obtained in a normal state, which is used to detect a fault generated in the smart device, with respect to at least one performance indicator, with an FDI value observed in real time and detect the fault by calculating a relative variation level of the FDI values;
    an association degree checking unit configured to check association with a diagnosis object (hereinafter referred to as 'DO') including a cause and a countermeasure of the detected fault; and
    a relevance estimating unit configured to compare association degree values checked by the association degree checking unit and create a DO having a maximum relevance value.

13. The device according to claim 12, further comprising:
    a profile generating unit configured to generate a profile including the FDI value in the normal state; and
    a profile DB configured to store the generated FDI profile, wherein the FDI level calculating unit is configured to detect and use the FDI value in the normal state from the FDI profile DB.

14. The device according to claim 13, wherein the profile generating unit is configured to calculate an average value and a variance value of FDI values monitored when each performance indicator is in a normal state, identify a probability distribution model that is the most appropriate for an individual FDI by analyzing the calculated average value and the variance value, and store profiles including the average value, the variance value, and the probability distribution model of the FDI values in the FDI profile DB.

15. The device according to claim 14, wherein the profile generating unit is configured to extract average values of the monitored FDI values at a predetermined interval, and then calculate an average of the average values at the predetermined interval.

16. The device according to claim 14, wherein the profile generating unit is configured to repeatedly generate profiles under different conditions including a measured time zone, a target device, a target application, and a target event.

17. The device according to claim 12, wherein the FDI level calculating unit is configured to collect observed FDI values of the smart device, calculate an average of the collected FDI values, detect a profile appropriate for the observed FDI values, change the calculated average to a random variable of a specific probability distribution model using the detected profile, calculate an FDI level value using the random variable of the specific probability distribution model, and determine whether the fault is generated based on the calculated FDI level value.

18. The device according to claim 12, further comprising a repair listing unit configured to list at least one repair configured with a pair of a subset of the FDI and the DO.

19. The device according to claim 18, wherein the repair listing unit is configured to sort the listed at least one repair based on specific criteria (date of repair generation).

20. The device according to claim 12, wherein the association degree checking unit is configured to calculate a relative occurrence frequency of the FDI in repairs including the specific DO, and calculate an association degree between the specific DO and the FDI according to the calculated relative occurrence frequency.

* * * * *